US012575481B2

(12) United States Patent
Boetsch

(10) Patent No.: US 12,575,481 B2
(45) Date of Patent: Mar. 17, 2026

(54) SEED DISPENSER FOR THE SOWING TRAIN OF AN AGRICULTURAL SEEDING MACHINE AND METHOD FOR SUPPLYING MISSING SEEDS

(71) Applicant: BPB Mediterranea S.A., Villa Maria (AR)

(72) Inventor: Gustavo Alejandro Boetsch, Villa Maria (AR)

(73) Assignee: BPB Mediterranea S.A., Villa Maria (AR)

( * ) Notice: Subject to any disclaimer, the term of this patent is extended or adjusted under 35 U.S.C. 154(b) by 0 days.

(21) Appl. No.: 18/808,002

(22) Filed: Aug. 18, 2024

(65) Prior Publication Data

US 2025/0063979 A1    Feb. 27, 2025

(30) Foreign Application Priority Data

Aug. 23, 2023    (AR) ............................ P20230102232

(51) Int. Cl.
*A01C 7/12* (2006.01)
*A01C 7/04* (2006.01)

(52) U.S. Cl.
CPC .............. *A01C 7/127* (2013.01); *A01C 7/046* (2013.01)

(58) Field of Classification Search
CPC .. A01C 7/127; A01C 7/12; A01C 7/08; A01C 7/00; A01C 7/046; A01C 7/044; A01C 7/042; A01C 7/04
See application file for complete search history.

(56) References Cited

U.S. PATENT DOCUMENTS

2004/0134399 A1* 7/2004 Stephens .................. A01C 7/16
                                                          111/178
2020/0000018 A1* 1/2020 Boetsch ................ A01C 7/105

FOREIGN PATENT DOCUMENTS

WO    WO-2014018717 A1 * 1/2014    .............. A01C 7/20

* cited by examiner

*Primary Examiner* — Christopher J. Novosad
(74) *Attorney, Agent, or Firm* — Joseph L. Morales, Esq.; The Morales Law Firm

(57) ABSTRACT

A seed distributor for a seeding train of an agricultural seeding machine. The distributor has a seed disk formed on a first toothed wheel, the teeth of which mesh with the respective teeth of a second toothed wheel which in turn carries a seed transport belt. The set of gears of the distributor are driven by a single motor.

7 Claims, 4 Drawing Sheets

FIG.
3

SEED DISPENSER FOR THE SOWING TRAIN OF AN AGRICULTURAL SEEDING MACHINE AND METHOD FOR SUPPLYING MISSING SEEDS

CROSS-REFERENCE TO RELATED APPLICATIONS

This application claims priority from Argentinean application serial number P230102232 filed on Aug. 23, 2023, which is incorporated herein by reference in its entirety.

FIELD OF THE INVENTION

The present application is directed to a seed dispenser for the sowing train of an agricultural seeding machine and a method for supplying missing seeds. The seed dispenser is of the type that combines means capable of delivering the seeds through a discharge tube, towards the sowing furrow, in a synchronized manner, simultaneously with the advance of the machine, ensuring continuity and operational efficiency.

More specifically, the present invention refers to a novel discharge system that is constituted from a rotating disc that receives the seeds, which are accumulated through the help of pressurized air currents (either positive or negative), from where they are subsequently discharged unitarily into a discharge tube, which receives the seed, to transfer it, and deposit it at the bottom of the furrow.

BACKGROUND

Argentinean patent AR 112430 B1 entitled SEED DISPENSER FOR SEEDING MACHINES is related to the field of devices, means and arrangements used in agribusiness, more particularly in seeding machines, and more preferably, it refers to a seed dispenser that, unlike conventional dispensers, allows grain to be dispensed from the discharge duct or tube into the furrows in a constant and synchronized manner without alterations occurring between the sowing distances of the seeds.

This prior art discloses a seed dispenser for seeding machines, of the type that comprises a seed feeding inlet capable of housing seeds to be sown in a furrow previously made on the sowing surface. A seed dosing mechanism in communication with a discharge duct that has an outlet which is oriented towards said groove is taught. The dispenser comprises at least two parallel and independent seed transportation chains, each of said being at least two parallel and independent seed transportation chains mounted on a corresponding gear, with each of said at least two parallel and independent seed transportation chains forming a closed loop, wherein said at least two parallel seed transportation chains and independent are adjacent to each other to extend, along a portion of the closed loop, within the discharge conduit to the outlet mouth of the discharge conduit, at least one pair of seed sensors, each seed sensor of said at least one pair of seed sensors arranged adjacent to one side of a respective chain of said at least two parallel and independent seed transportation chains, and at least one electronic controller in communication with at least one seeding monitor and with a groove module; wherein said sowing monitor is provided with at least one sowing profile, map or parameter, whose sowing operational characteristics are sent to said electronic controller so that the latter, based on the sowing operational characteristics requested and dependent on each type seeding, send a signal corresponding to said furrow module which will send its respective activation or drive signal to a pair of electric motors, each of which selectively rotates a corresponding rotating plate, thus allowing the sowing process to be carried out through the corresponding driven seed transportation chain, and wherein said discharge conduit is provided with seeds by means of said at least two parallel and independent seed transportation chains so that when one of said at least two chains of parallel and independent seed transportation chains does not have seeds in a position in the outlet mouth, the other of said at least two parallel and independent seed transportation chains discharges the seed housed in the other of said at least two parallel and independent seed transportation chains.

Argentinean patent AR112430 B1 shows a seed dispenser that has a dosing mechanism that constantly supplies seeds, capable of operating in a synchronized manner, guaranteeing the constant fall of seed without alterations or lags or interruptions, for which it establishes a synchronized double feeding metering mechanism to allow the constant fall of the seed, for which it comprises a seed feeding inlet in communication with a seed receptacle through which a seed metering mechanism takes the seeds and discharges them into a conduit discharge whose outlet is oriented towards the respective groove previously made in the surface.

This same invention includes a pair of rotating plates independent of each other which are driven through a respective axis of rotation which in turn is driven through an electric motor, a plurality of arms arranged radially on the perimeter of each rotating plate, which have a distal end provided with at least one seed collection means, at least two central gears independent of each other, rotatively mounted between said rotating plates and driven by means of the corresponding rotation axis, at least two chains of transportation of seeds parallel and independent of each other, mounted on said central gears from which they extend in the form of a closed loop along the discharge duct to the outlet mouth, and at least a pair of secondary ducts that have an entrance of metered seed and a metered seed outlet that is oriented towards the respective transportation chain; providing at least a pair of sensors arranged adjacent to each side of said seed transportation chains. These sensors allow us to identify if the corresponding chain carries at least one seed in each link.

In case of having two seeds together in the same link, the dispenser includes a pair of rotating pallets for expelling overloaded seeds arranged on each side of the transportation chains, said rotating pallets being driven by an electric motor. In this way, with the rotation of the paddles the seeds are expelled, and the link remains empty (without seeds). As an alternative, not illustrated because it is a well-known mechanical resource, instead of the paddles, an electric actuator can be arranged on each side of the chains. The concept is that, according to the invention, since there are two chains in parallel, it is preferable to have an empty cell than a cell overloaded with two or more seeds. The empty cell of one of the chains will be detected and remains stopped in the discharge position while the other chain is put into operation to proceed to enter the seed that corresponds and thus continue the download in order.

It is clear that, according to this previous embodiment, to incorporate a missing seed that does not appear in the chain link, it remains stopped and the other chain automatically begins to perform the corresponding download and continue with the continuous download of the seeds that move forward below.

The prior art does not describe, nor even suggest the option of increasing or decreasing the speed of the transportation chain as a simple and direct resource to replace missing seed. Argentinean patent AR113261 B1 entitled seed drill with high-speed seed dispenser device refers to an agricultural sowing implement that includes several units in a row. The row units include one or more seed meters for receiving, singling out and dispensing seed to the soil so that the preferred spacing of the next seed is achieved.

A seed meter provides seeds, one at a time, to a seed carrier, such as a brush wheel. The brush wheel can move seeds one at a time to a seed conveyor by directly moving the seeds along a curved portion of a seed disc in the seed meter. The seed conveyor may be a floating belt, and the speed of the seeds when transferred from the seed conveyor may match the speed of the floating belt. The seed conveyor transports seeds to a position near the bottom of a furrow and ejects the seeds with little or no horizontal velocity relative to the bottom of the furrow.

In its most basic form, the device described in AR113261 is made up of a casing and a seed disc forming a housing to house seeds. The seed disk resides within the housing and rotates about a generally horizontal central axis. As the seed disc rotates, it passes through the seed hopper where it collects individual seeds. The seeds are then metered from the seed meter and transported to the seed furrow. The spacing of the seeds in the seed furrow is approximately controlled by varying the rotation speed of the seed disc.

The most common seed delivery system for delivering seeds from the seed disc to the furrow can be classified as a gravity drop system. In the case of the gravity drop system, a seed tube has an inlet end, which is placed below the seed metering system. The individual seeds from the seed metering system fall into the seed tube and fall by gravitational force from one discharge end of the tube into the seed furrow. Monitoring systems are commonly used to monitor planter operation. Such systems typically employ a seed sensor attached to each seed tube to detect the passage of seeds therethrough.

It involves providing a controlled delivery of seed from a seed meter to the ground in which a seed experiences a near-zero horizontal speed with respect to the ground, regardless of the speed of the seeder.

The essential feature of seed meters is that they present seeds, one at a time, to a rotating brush that is in communication with the seed meters.

The rotating brush moves the seeds toward a conveyor that delivers them near a furrow to be discharged from the conveyor with a horizontal velocity component that substantially and reciprocally coincides with the forward speed of the row unit, so that the speed horizontal of each seed with respect to the ground is zero, or almost zero. In other words, the seeds fall more or less directly downward without the direction of travel of the seeder imparting them any forward momentum.

The prior art does not disclose the resource of varying the speed of seed discharge carried out by the seed conveyor towards the release or discharge point when there is a lack of seed in one of its receptacles.

SUMMARY OF THE INVENTION

The present invention essentially consists of a seed distributor applied to the sowing train of an agricultural sowing machine that stands out especially because it comprises a seed disk formed on a first toothed wheel, the teeth of which mesh with the respective teeth of a second toothed wheel which in turn carries a seed transport belt; said set of gears being driven by a single motor.

It is possible that the single motor that moves the gears is linked, through gears, to the first gear wheel on which the seed receiving disk is formed. However, the single motor that drives the gear set can be linked not to the first gear but to the second gear, also by means of gearing.

In the case of linking the only motor to the first gear wheel, the second gear wheel receives movement by its linkage with the first gear wheel. If, on the other hand, the single motor is linked to the second gear wheel, the first gear wheel receives movement through its linkage with the second gear wheel.

Also, the seed transport belt, which is driven by the second gear wheel, is located inside a discharge tube. On the other hand, there is a first group of individual housings arranged in the peripheral area of the aforementioned seed receiving disk and in synchrony with a second group of individual housings arranged on the seed transport belt, in such a way as to enable each seed housed in one of the housings of the first group of individual housings to fall, by gravity, into one of the individual housings of the second group of individual housings when both individual housings face each other when the gear set of the dosing body moves.

In addition, the seed dispenser of the present invention comprises a sensor capable of detecting the lack of seed in any of the individual housings of the second group of individual housings arranged on the seed transport belt.

It is a clear advantage of the present invention that the components that make up the dispenser are synchronized by the way in which they are linked to each other in such a way that a single motion-generating motor is the one that imparts perfectly synchronized motion to the whole set. This makes it possible for the adjustment of the working speed of the entire dispenser to occur instantly and automatically, with a simple change in the rotation speed of the single motor, based on what has been registered and/or preloaded into the system.

The technical innovation proposed by this invention lies in the fact that any possible seed shortage can be replaced by increasing the operating speed of the entire system, regardless of the forward speed of the tractor.

The movement of the system is generated from a single point, that is, by producing the control in only one of the components that make up the invented dispenser, the entire assembly can be moved with a single motor and have greater control. In other words, the source of movement generation is only one, due to the toothed transmissions that each of the corresponding pieces.

Another important advantage of this dispenser is the way in which the seeds are transferred from the seed disc to the transportation belt or chain. In the aforementioned prior art, the seeds pass through two discs with fins that rotate in opposite directions and deposit them in the chain, therefore there is a moment where the seed falls by gravity, passes through a transition zone where the discs are, and the fins guide and push the seed into the slots of the transportation chain or belt.

According to the prior art, the loading disc is not directly linked to the chain, meaning that each one can rotate at different speeds, which, among other things, implies the need to have more of an motor for full operation. Managing the entire assembly with a single motor, as proposed by the present invention, makes it possible to have greater and better control, timing, and performance.

In the present invention, the loading disc and the chain or belt are physically linked by a gear, there are no intermediate discs with fins, and the seeds pass from the disc directly to the chain slot, so, when accelerating the disc load, so does the chain and in the same proportion, since they are linked. This is a clear performance improvement that has not been shown or even suggested by the prior art.

No seed dispenser applied to the sowing train of an agricultural seeding machine, of those currently known, proposes, or even suggests, the constructive solution that arises from what is indicated in the preceding paragraphs, which is why it is a proposal that, in addition to being novel, has a clear inventive activity.

BRIEF DESCRIPTION OF THE FIGURES

To specify the advantages briefly discussed, to which users and experts in the specialty can add many more, and to facilitate the understanding of the constructive, constitutive, and functional characteristics of the invented seed dispenser, an example of a preferred embodiment is described below, which is illustrated, schematically and without a specific scale, in the attached sheets, with the express clarification that, precisely because it is an example, it is not appropriate to assign to it a limiting or exclusive nature of the scope of protection of the present invention, but simply has a merely explanatory and illustrative intention of the basic conception on which it is based.

FIG. 3 is a sectional view, in a vertical plane, that schematically represents the basic combination of parts and components that make up the seed dispenser of this invention.

In all figures, the same reference numbers and letters correspond to the same or equivalent parts or elements constituting the assembly, according to the example chosen for the present explanation of the invented seed dispenser.

DETAILED DESCRIPTION

It should be noted that the Images and description described below have been incorporated as an example in order to allow an adequate interpretation of its integral functioning, but it should be noted that this example is only for reference purposes, since they may change their use in the components that make it up, maintaining its constructive and functional conception. The invented dispenser can work with different accessories, different types and sources of motor power, different peripheral parts, etc.

The first two figures show what is called a sowing train that belongs to a conventional agricultural sowing machine, of the type that is installed from a mounting structure (E) that is fixed to the chassis of the machine and from which the working implements are projected, such as the furrow opener blade, the capping wheels (T), the seed pressing wheel(S), the furrow sealer (R) and other implements that work together with the advance of the machine.

Figure 1:
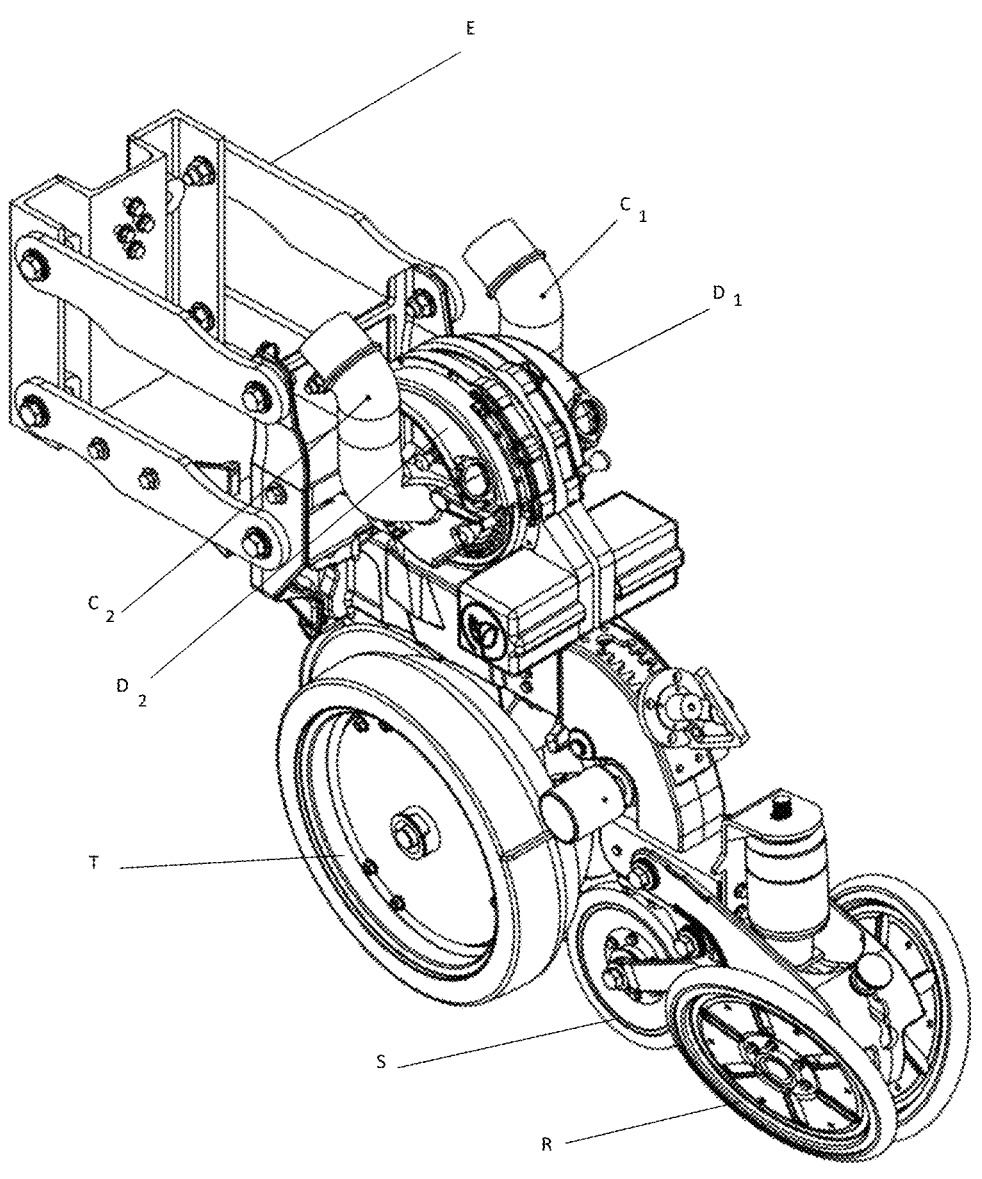
FIG. 1 is a schematic perspective view that shows a sowing train that may belong to a conventional agricultural seeding machine, in this case distinguished because it includes two paired seed dispenser devices, incorporated therein.
Figure 2:
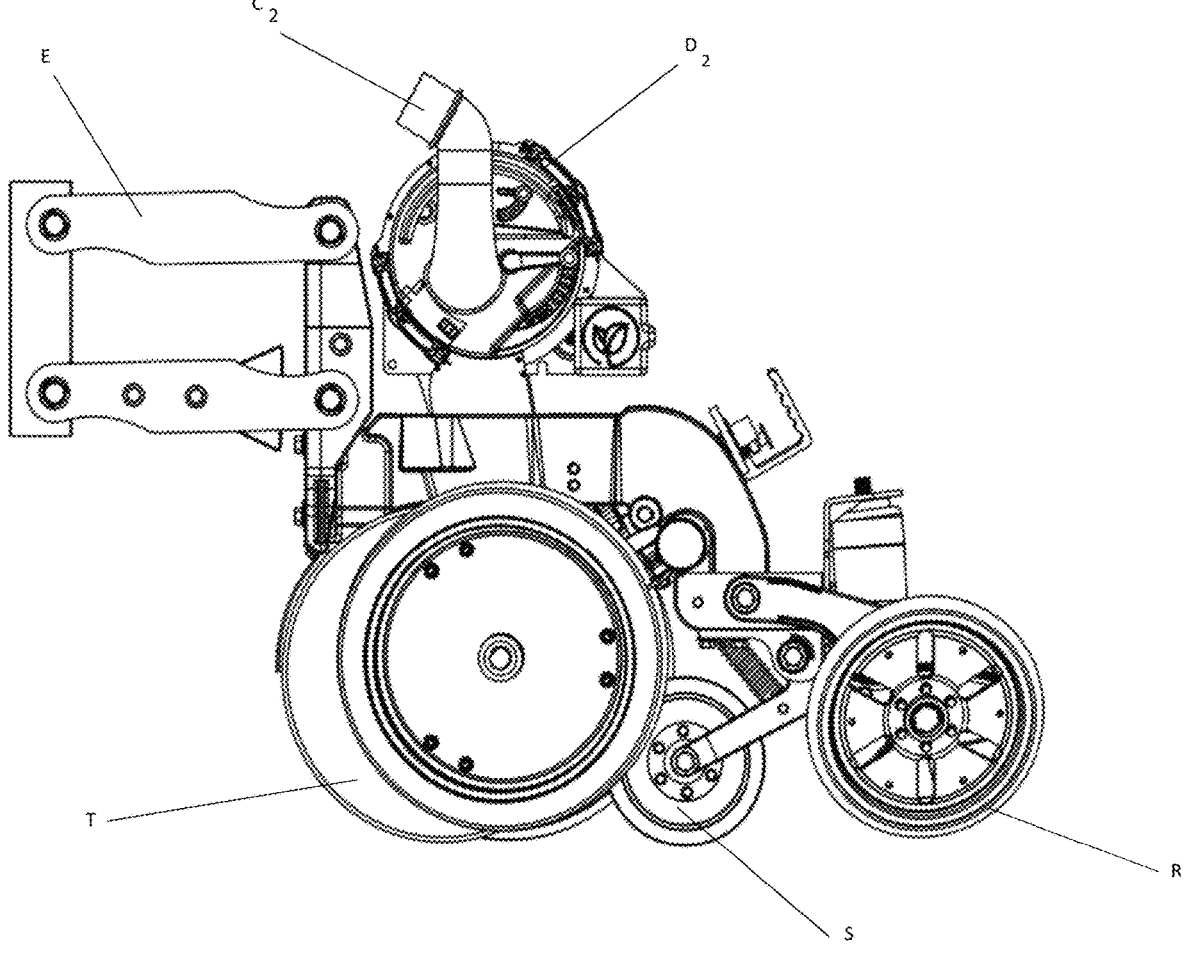
FIG. 2 is a side view of the same sowing train as in the previous figure.

In said FIGS. 1 and 2, the sowing train has two paired seed dispensers incorporated, namely, a dispenser (D1) on the right side, and another dispenser (D2) on the left side, both arranged in the same sowing train, being able to note the corresponding ducts for the pressurized air supply (C1) and (C2).

Figure 4:
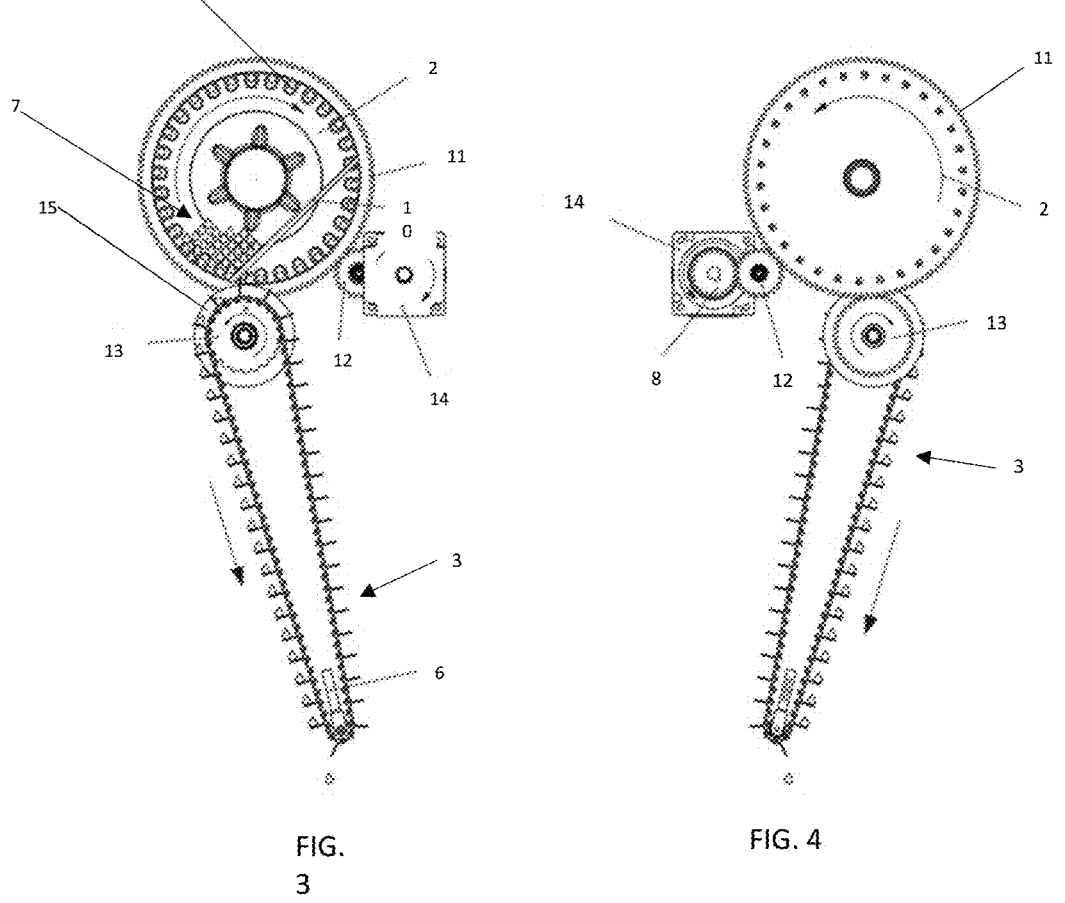
FIG. 4 is also a schematic sectional view, in a vertical plane, incorporated to show a way of linking, with gears, the components that make up the invented dispenser.

Looking now at FIGS. 3 and 4, it is possible to see that the dispenser of this invention is made up of a seed receiving disc (2) inside which a seed loading area (7) is defined.

This seed receiving disc (2) rotates in the same clockwise direction, being arranged on a first toothed wheel (11), (in the priority referred to as "seed disc teeth"—11—), being driven and controlled by a single motor (14) which is linked to said first toothed wheel (11) through an intermediate gear (12).

As shown in FIG. 4, when the single motor (14) is activated, its power and rpm are transmitted to a first gear wheel (11), on which the seed receiving disk (2) is formed, for which it is contemplated to use a gear train (8) that is linked to the aforementioned intermediate gear (12).

Figure 5:
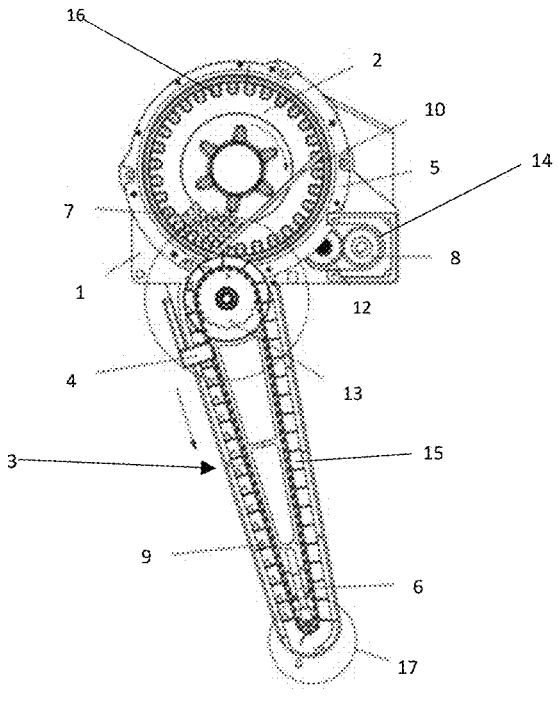
FIG. 5 is also a sectional view in a vertical plane that shows the same dispenser as in the previous figures, where the combination of components appears that, together, determine the dispenser of this invention.
Figure 6:
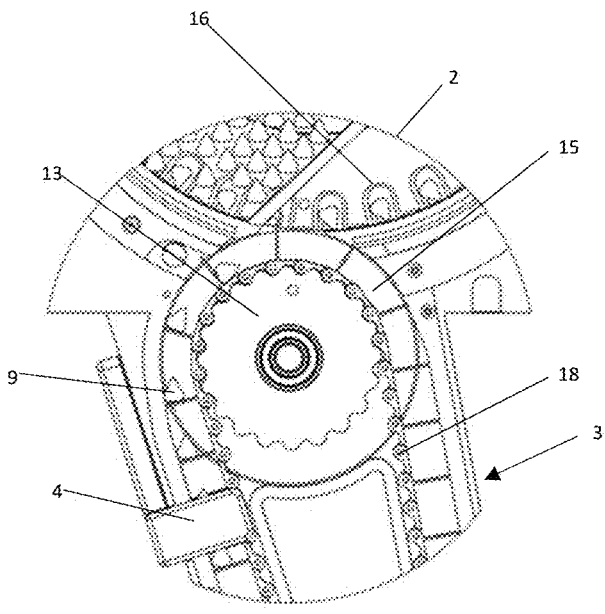
FIG. 6 is an enlarged detail, in vertical section, which shows the sector where the transition section of the seeds occurs from the disc that receives and stores them, to the discharge tube that deposits them, one by one, in the groove.

FIGS. 5 and 6 show that the movement transmitted from the single motor (14) at the programmed speed produces the rotation of the first toothed wheel (11) on which the seed receiving disk (2) is arranged, all of which is mounted on the body of the dispenser (1) and contained by the external surface (5) thereof. It is clarified that there are also several other components that do not define or influence what this invention determines, given which they are not described herein.

Especially in FIGS. 3, 5 and 6 it can be seen that there is an initial area called the seed loading area (7), a space where the seeds settle (9). It can be seen that, with the rotation of the seed receiving disc (2), clockwise, and with the help of the pneumatic pressure generated from the ducts (C1) and C2), the disc is loaded with seeds. A distribution brush (10) is used through which each seed (9) is placed in a corresponding individual housing of a first group of individual housings (16) of the seed receiving disk (2). These individual housings belonging to the first group of individual housings are arranged on the periphery of the seed receiving disc (2), close to its toothed edge.

When making less than a complete revolution of this first zone, the so-called transition zone is found. This is where the seed transport belt (18) of the discharge tube (3), is driven by a second toothed wheel (13) and has a second group of individual housings (15) or "slots" that allow each seed (9) to be received, coming from the individual housings of the first group of individual housings (16), in order to transfer it to its deposit in the furrow.

Especially FIGS. 5 and 6 show that, with the movement of the seed transport belt (18) that integrates the discharge tube (3), each of the individual housings of the second group of individual housings (15), passes through a sensor (4), so that, in case of not detecting missing seeds, the transfer continues, and the seed is delivered to the bottom of the furrow in the lower discharge area (17).

As previously explained, if the aforementioned sensor (4) detects a lack of seed in one of the individual housings of the second group of individual housings (15), the system automatically makes an adjustment by increasing the speed of the only motor (14), which simultaneously generates an increase in the linear speed of the seed transport belt (18). In this way, it is possible to compensate for the absence of seeds that the sensor (4) detects as missing, with a subsequent seed so that it is located in the place and position of the missing one. Then, through this continuous adjustment in the equipment dynamics, the predefined operational work speed is recovered in a very short period of time.

Thus constituted the distributor of this invention, it is seen that the movement of the entire system can be initiated and controlled by a single motor (14) that is linked to a first gear wheel (11) using an intermediate gear (12) that meshes with both pieces.

Said first gear wheel (11) is linked to the second gear wheel (13) (in the priority referred to as "gear"—13—), which integrates the entire subset for transporting seeds to the bottom of the furrow, together with the transport belt (18) of the discharge tube (3) and its tensioner (6).

It is highlighted that, thanks to the way in which the aforementioned elements that make up the invented dispenser are linked, it is possible to drive the entire assembly from an initial motor unit, therefore, a variation in the output speed of the motor instantly affects the entire set equally.

It is clear from what has been previously described and illustrated that the present invention stands out because the dispenser is activated and controlled from the generation of the movement in only one of the components that make it up, due to the synchronization that exists between its constituent parts.

Also notable is the ability to make adjustments to its work speed in very short periods of time and progressively, which allow it to compensate for missing seeds detected by the relevant sensor.

As indicated previously, it is possible that one of these dispensers can work for each sowing line, but it can work in pairs, that is, for certain needs to be covered, there could be two units of these per furrow line. This allows working with different seed hybrids on demand for each batch, and intelligently with all information systems.

The invented dispenser thus constituted; it can be said that it carries out the following succession of operational stages:

a) The sensor (4) detects the lack of seed in one of the individual housings of the second group of individual housings (15) of the seed transport belt (18), b) The seed distributor controller sets the time remaining for the empty box to reach the area where the missing seed should be unloaded.

c) When the empty box arrives at the location immediately before the unloading area, the single motor (14) momentarily increases the speed of the entire seed distributor, and with it, the linear speed of the seed transport belt (18), while maintaining the forward speed of the sowing machine constant, in order to place, at the right time, the next box (which does contain seed) in the unloading area and thus guarantee the delivery of a seed in the right place and at the right time.

d) After delivery of the seed, the single motor (14) slows down its speed and the entire distributor returns to work at the originally set working speed.

What is claimed is:

1. A seed distributor for a seeding train of an agricultural seeding machine, comprising:

a seed disk formed on a first toothed wheel having a plurality of teeth that defines a first gear;

the first gear meshing with a second gear defined by the teeth of a second toothed wheel;

the second toothed wheel being a carrier of a seed transport belt;

said first gear and second gear being individually driven by a single motor.

2. The seed distributor of claim 1, wherein the first toothed wheel is mechanically coupled to the single motor through a coupling that establishes a direct transmission between the single motor and the first toothed wheel;

and wherein the rotation of the first toothed wheel drives the second toothed wheel through direct meshing between the first gear and the second gear.

3. The seed distributor of claim 1, wherein the second toothed wheel is mechanically coupled to the single motor through a coupling that establishes a direct transmission between the single motor and the second toothed wheel, and wherein the rotation of the second toothed wheel drives the first toothed wheel through direct meshing between the second gear and the first gear.

4. The seed distributor of claim 1, wherein the seed transport belt is located inside a discharge tube.

5. The seed distributor of claim 1, wherein the seed disc formed on the first toothed wheel has a first group of individual housings arranged in the peripheral area of the aforementioned seed disc and in synchrony with a second group of individual housings arranged on the seed transport belt, in such a way as to enable each seed housed in one of the housings of the first group of individual housings to fall, by gravity, into one of the individual housings of the second group of individual housings when both individual housings face each other.

6. The seed distributor of claim 5, further comprising a sensor capable of detecting the lack of seed in any of the individual housings of the second group of individual housings arranged on the seed transport belt.

7. The seed distributor of claim 1, wherein the first toothed wheel is connected to the second toothed wheel, which carries the seed transport belt through at least one intermediate gear.

* * * * *